US009006618B2

(12) United States Patent  
Lamesch et al.

(10) Patent No.: US 9,006,618 B2  
(45) Date of Patent: Apr. 14, 2015

(54) COMBINED SEAT HEATER AND CAPACITIVE OCCUPANCY SENSOR

(75) Inventors: Laurent Lamesch, Reichlange (LU); Aloyse Schoos, Bertrange (LU)

(73) Assignee: IEE International Electronics & Engineering S.A., Luxembourg (LU)

( * ) Notice: Subject to any disclaimer, the term of this patent is extended or adjusted under 35 U.S.C. 154(b) by 308 days.

(21) Appl. No.: 13/637,110

(22) PCT Filed: Mar. 22, 2011

(86) PCT No.: PCT/EP2011/054343  
§ 371 (c)(1),  
(2), (4) Date: Sep. 25, 2012

(87) PCT Pub. No.: WO2011/117237  
PCT Pub. Date: Sep. 29, 2011

(65) Prior Publication Data  
US 2013/0015863 A1    Jan. 17, 2013

(30) Foreign Application Priority Data  
Mar. 25, 2010 (EP) ..................................... 10157803

(51) Int. Cl.  
*H05B 1/02* (2006.01)  
*B60N 2/00* (2006.01)  
(Continued)

(52) U.S. Cl.  
CPC .............. *B60N 2/002* (2013.01); *B60N 2/5685* (2013.01); *B60R 21/01532* (2014.10)

(58) Field of Classification Search  
CPC ................. B60N 2/002; B60N 2/5685; B60R 2021/01529; H05B 1/02; H05B 1/0236; H05B 1/0202; H05H 1/0238; H05H 1/0236; H05H 1/0202; H05H 3/0042

USPC ......... 219/202, 203, 494, 497, 501, 507–510; 340/686.6  
See application file for complete search history.

(56) References Cited

U.S. PATENT DOCUMENTS 3,705,365 A   12/1972   Szabo et al.  
4,104,715 A    8/1978   Lawson, Jr.  
(Continued)

FOREIGN PATENT DOCUMENTS

DE   102009055424 A1   7/2011  
EP       1553699 A1   7/2005  
(Continued)

OTHER PUBLICATIONS

Luxembourg Search Report; Luxembourg Application No. 91879: Dated May 3, 2012.  
(Continued)

*Primary Examiner* — Mark Paschall  
(74) *Attorney, Agent, or Firm* — Cantor Colburn LLP

(57) ABSTRACT

A combined seat heater and capacitive occupancy sensor comprises a heating element (10) connected between a first (21) and a second (22) node, and a capacitive sensing network connected to the heating element to apply an oscillating voltage thereto and to derive the capacitive load of the heating element. A common mode choke (16) connects the first and second node to a third (23) and fourth (24) node, respectively. The capacitive sensing network comprises an oscillator (28), AC-coupled to the third and/or the fourth node to drive oscillating voltage into that node, and a transimpedance amplifier (32), which has a first input to receive the oscillating voltage as reference voltage and a second input operatively connected to the heating element. The transimpedance amplifier maintains a voltage on its second input equal to the reference voltage by driving a current into the second input. An output signal (44) indicates the AC component of the current driven into the second input.

19 Claims, 7 Drawing Sheets

(51) Int. Cl.
*B60N 2/56* (2006.01)
*B60R 21/015* (2006.01)

(56) References Cited

U.S. PATENT DOCUMENTS

| | | | |
|---|---|---|---|
| 4,363,008 | A | 12/1982 | Chambers, Jr. |
| 6,161,070 | A | 12/2000 | Jinno et al. |
| 6,392,542 | B1 | 5/2002 | Stanley |
| 6,661,115 | B2 | 12/2003 | Lester |
| 6,703,845 | B2 | 3/2004 | Stanley et al. |
| 7,521,940 | B2 | 4/2009 | Koch et al. |
| 8,373,952 | B2 | 2/2013 | Mirafzal et al. |
| 2004/0113634 | A1* | 6/2004 | Stanley et al. ............ 324/661 |
| 2008/0186282 | A1* | 8/2008 | Nix et al. ............ 345/173 |
| 2009/0295199 | A1 | 12/2009 | Kincaid et al. |
| 2009/0295411 | A1 | 12/2009 | Hansen |
| 2010/0038351 | A1* | 2/2010 | Tabaczynski ............ 219/202 |
| 2011/0121618 | A1 | 5/2011 | Fischer et al. |
| 2011/0148648 | A1* | 6/2011 | Fischer et al. ............ 340/686.6 |
| 2012/0234816 | A1* | 9/2012 | Petrenko et al. ............ 219/203 |
| 2013/0027065 | A1* | 1/2013 | Stanley et al. ............ 324/705 |

FOREIGN PATENT DOCUMENTS

| | | |
|---|---|---|
| EP | 2036764 A1 | 3/2009 |
| EP | 2090460 A1 | 8/2009 |
| JP | 10325136 A | 12/1998 |
| WO | 9217344 A1 | 10/1992 |
| WO | 9513204 A1 | 5/1995 |
| WO | 2008095939 A1 | 8/2008 |

OTHER PUBLICATIONS

International Search Report; International Application No. PCT/EP2011/054343; International Application Filing Date Mar. 22, 2011; Mail Date Jun. 1, 2011.

Joshua Smith, "Electric Field Sensing for Graphical Interfaces" IEEE Computer Graphics and Applications, published in Computer Graphics I/O Devices, Issue May/Jun. 1998, pp. 54-60.

Written Opinion International Application No. PCT/EP2011/054343; International Application Filing Date Mar. 22, 2011; Mail Date Jun. 1, 2011.

International Search Report; International Application No. PCT/EP2011/054346; International Application Filing Date Mar. 22, 2011; Mail Date May 24, 2011.

Luxembourg Search Report; Luxembourg Application No. LU91872; Dated May 2, 2012.

Written Opinion; International Application No. PCT/EP2011/054346; International Application Filing Date Mar. 22, 2011; Mail Date May 24, 2011.

* cited by examiner

COMBINED SEAT HEATER AND CAPACITIVE OCCUPANCY SENSOR

FIELD OF THE INVENTION

The present invention generally relates to a capacitive occupant detection system, e.g. for detecting the absence or presence of an occupant seated on a vehicle seat. More specifically, the invention relates to a combined seat heating and capacitively occupancy sensing device.

BACKGROUND OF THE INVENTION

A capacitive sensor, called by some electric field sensor or proximity sensor, designates a sensor, which generates a signal responsive to the influence of what is being sensed (a person, a part of a person's body, a pet, an object, etc.) upon an electric field. A capacitive sensor generally comprises at least one antenna electrode, to which is applied an oscillating electric signal and which thereupon emits an electric field into a region of space proximate to the antenna electrode, while the sensor is operating. The sensor comprises at least one sensing electrode at which the influence of an object or living being on the electric field is detected. In some (so-called "loading mode") capacitive occupancy sensors, the one or more antenna electrodes serve at the same time as sensing electrodes. In this case, the measurement circuit determines the current flowing into the one or more antenna electrodes in response to an oscillating voltage being applied to them. The relationship of voltage to current yields the complex impedance of the one or more antenna electrodes. In an alternative version of capacitive sensors ("coupling mode" capacitive sensors), the transmitting antenna electrode(s) and the sensing electrode(s) are separate from one another. In this case, the measurement circuit determines the current or voltage that is induced in the sensing electrode when the transmitting antenna electrode is operating.

The different capacitive sensing mechanisms are explained in the technical paper entitled "Electric Field Sensing for Graphical Interfaces" by J. R. Smith, published in Computer Graphics I/O Devices, Issue May/June 1998, pp 54-60. The paper describes the concept of electric field sensing as used for making non-contact three-dimensional position measurements, and more particularly for sensing the position of a human hand for purposes of providing three dimensional positional inputs to a computer. Within the general concept of capacitive sensing, the author distinguishes between distinct mechanisms he refers to as "loading mode", "shunt mode", and "transmit mode" which correspond to various possible electric current pathways. In the "loading mode", an oscillating voltage signal is applied to a transmit electrode, which builds up an oscillating electric field to ground. The object to be sensed modifies the capacitance between the transmit electrode and ground. In the "shunt mode", an oscillating voltage signal is applied to the transmit electrode, building up an electric field to a receive electrode, and the displacement current induced at the receive electrode is measured, whereby the displacement current may be modified by the body being sensed. In the "transmit mode", the transmit electrode is put in contact with the user's body, which then becomes a transmitter relative to a receiver, either by direct electrical connection or via capacitive coupling. "Shunt mode" is alternatively referred to as the above-mentioned "coupling mode".

Capacitive occupant sensing systems have been proposed in great variety, e.g. for controlling the deployment of one or more airbags, such as e.g. a driver airbag, a passenger airbag and/or a side airbag. U.S. Pat. No. 6,161,070, to Jinno et al., relates to a passenger detection system including a single antenna electrode mounted on a surface of a passenger seat in an automobile. An oscillator applies on oscillating voltage signal to the antenna electrode, whereby a minute electric field is produced around the antenna electrode. Jinno proposes detecting the presence or absence of a passenger in the seat based on the amplitude and the phase of the current flowing to the antenna electrode. U.S. Pat. No. 6,392,542, to Stanley, teaches an electric field sensor comprising an electrode mountable within a seat and operatively coupled to a sensing circuit, which applies to the electrode an oscillating or pulsed signal "at most weakly responsive" to wetness of the seat. Stanley proposes to measure phase and amplitude of the current flowing to the electrode to detect an occupied or an empty seat and to compensate for seat wetness.

The idea of using the heating element of a seat heater as an antenna electrode of a capacitive occupancy sensing system has been known for a long time. WO 92/17344 A1 discloses a an electrically heated vehicle seat with a conductor, which can be heated by the passage of electrical current, located in the seating surface, wherein the conductor also forms one electrode of a two-electrode seat occupancy sensor.

WO 95/13204 discloses a similar system, in which the oscillation frequency of an oscillator connected to the heating element is measured to derive the occupancy state of the vehicle seat.

U.S. Pat. No. 7,521,940 relates to a combined seat heater and capacitive sensor capable of operating, at a time, either in heating mode or in occupant-sensing mode. The device includes a sensor/heat pad for transmitting a sensing signal, a first diode coupled to a first node of the sensor/heat pad, a second diode coupled to a second node of the sensor/heat pad, a first transistor coupled to the first diode and a second transistor coupled to the second diode. During sensing mode, the first and second transistors are opened and the nodes between the first transistor and the first diode, as well as between the second transistor and the second diode are reverse-biased to isolate the sensor/heat pad from the power supply of the heating circuit.

US 2009/0295199 discloses a combined seat heater and capacitive sensor, wherein each of the two terminals of the heating element is connected to the heating power supply via two transistors in series. The device may not operate in sensing mode and in heating mode at a time. When the device is in sensing mode, the nodes between each pair of transistors are actively kept at the same potential as the heating element by means of respective voltage followers in order to neutralize any open-switch impedance of the transistors.

The very same idea has already been disclosed in U.S. Pat. No. 6,703,845. As an alternative to transistors, that document discloses inductors to achieve a high impedance at the frequency of the oscillating signal between the heating element and the power source of the heating circuit. As in the previously discussed document, a voltage follower maintains the intermediate nodes substantially at the same potential as the heating element in order to effectively isolate, at the frequency of the oscillating signal, the power supply of the heating circuit from the heating element.

A disadvantage of the system disclosed in U.S. Pat. No. 6,703,845 is that the inductors used as AC-decoupling elements have to support the full heating current (up to 10 A DC and more) and present high AC impedance to the capacitive measurement circuit and the seat heater at the same time. High inductance and high operating DC current implies that the inductor have to be wound on large cores, which are expensive. Depending on the application chosen from U.S. Pat. No. 6,703,845, either two or four of these inductors have to be used.

BRIEF SUMMARY

The present invention provides a combined seat heater and capacitive occupancy sensor having the potential of more cost-efficient manufacture and improved detection performance.

A combined seat heater and capacitive occupancy sensor, e.g. for a vehicle seat, comprises a heater network including a heating element connected between a first node and a second node to dissipate heat when a heating current is caused to flow between the first and second nodes, and a capacitive sensing network connected to the heating element to apply an oscillating signal (current or voltage) thereto and to derive a capacitive load of the heating element from a current flowing into or a voltage resulting on the heating element in response to the application of the oscillating signal. According to the invention, the heater network comprises a common mode choke connecting the first and the second node to a third and a fourth node, respectively.

According to a preferred variant of the invention, the capacitive sensing network comprises an oscillator and a current meter, the oscillator being configured and arranged to apply an oscillating voltage as the oscillating signal to the first and/or the second node, via the current meter. The current meter is configured to provide a signal indicative at least of an AC component of a current driven into to the first and/or the second node. The current meter may e.g. include a transimpedance amplifier having a first input AC-coupled to the oscillator to receive the oscillating voltage as an AC component of a reference voltage and a second input operatively connected to the first and/or second node. The transimpedance amplifier is preferably configured to maintain a voltage on the second input node equal (within a certain tolerance range) to the reference voltage by driving a current into the second input and to output the signal indicative at least of an AC component of the current driven into the first and/or second node.

According to another variant of the invention, the capacitive sensing network comprises an oscillator which is AC-coupled to at least one of the third and fourth nodes to drive the oscillating voltage into the at least one of the third and fourth nodes as well as a transimpedance amplifier having a first input AC-coupled to the at least one of the third and fourth nodes to receive the oscillating voltage as an AC component of a reference voltage, a second input operatively connected to at least one of the first and second nodes, the transimpedance amplifier being configured to maintain a voltage on the second input node equal (within a certain tolerance range) to the reference voltage by driving a current into the second input, the transimpedance amplifier having an output to provide a signal indicative at least of an AC component of the current driven into the second input.

As used herein, the term "impedance" designates the modulus (absolute value) of the complex impedance, which is defined as the ratio between (complex) voltage and (complex) current.

In the following, we will assume that the heating current is direct current (DC) and that the current driven into the second input node of the transimpedance amplifier is an alternating current (AC) at the specific frequency of the oscillating voltage. This is insofar a simplification that transient states (e.g. switching on/or off of the heating current), noise and parasitic currents are not taken into account. However, since one may carry out a frequency-selective measurement of the current driven into the second input, Fourier components remote from the operating frequency of the oscillator may be neglected in the further discussion. It should be noted that the heating current need not be direct current in the strictest sense: it may be variable, but on a long time-scale, so as not to interfere with the current used for the capacitive measurement. For sake of simplicity, we will use "DC" to designate slowly varying or constant signals. The capacitance measurement network preferably operates at frequency selected in the range from about 100 kHz to about 10 GHz, more preferably in the range from about 500 kHz to about 30 MHz.

The present invention uses a common mode choke with a coupling factor close to unity to achieve AC-decoupling of the heating element from its power supply, which is operatively connectable to the third and fourth nodes. Using a common mode choke instead of separate inductors reduces the number of components and the costs.

The capacitive occupancy sensor operates in so-called loading mode. The AC component of the current driven into the heating element depends on the impedance (an thus the capacitance) of the heating element to ground.

Preferably, the heater network includes a further common mode choke connecting the third and the fourth node to a fifth and a sixth node, respectively, the fifth and sixth nodes being connectable to a power source for the heating network.

Alternatively, the heater network includes a first switch connected between the third and the fifth node, as well as a second switch connected between the fourth and sixth nodes, the fifth and sixth nodes being connectable to a power source for the heating network.

According to a preferred embodiment of the invention, the first and second nodes are AC-coupled with one another and/or the third and fourth nodes are AC-coupled with one another and/or the fifth and sixth nodes are AC-coupled with one another. Such AC-coupling is preferably achieved using a coupling capacitor. Any such coupling capacitors are chosen to have an impedance, which is substantially less than the impedance of the capacitance to be measured. The coupling capacitors thus represent shorts for the AC component of the current but isolate the DC component thereof. A coupling capacitor between the first and the second node, or between the third and the fourth node of the heater network ascertains that the capacitive occupancy sensor remains operational even if the heating element should break. Either the fifth or the sixth node of the heater network is usually operatively connected (e.g. via a switch or directly) to ground, while the other is operatively connected (e.g. via a switch or directly) to the high potential of the DC power source that powers the heating element. In practical applications, the switch of the heater network is on the low-potential side of the DC power source due to the lower cost of a low-side switch. A coupling capacitor between the fifth and the sixth node of the heater network thus prevents AC originating from the oscillator to be fed into the DC power source and thus into the car power network.

According to a preferred embodiment of the invention, the second input of the transimpedance amplifier is AC-coupled to the at least one of the first and second nodes with a coupling capacitor. Such coupling capacitor prevents direct current from flowing into the transimpedance amplifier.

According to a further preferred embodiment of the invention, the capacitive sensing network comprises a compensating network configured to compensate a DC voltage drop between the first and second input of the transimpedance amplifier. Preferably, the compensating network comprises a feedback loop configured to add a compensating voltage to the oscillating voltage to produce the reference voltage. Such feedback loop may e.g. comprise an error amplifier and a summing network, the summing network being connected between the at least one of the third and fourth nodes, the error amplifier and the first input of the transimpedance amplifier, the error amplifier being configured to output the compensating voltage when there is a DC voltage drop between the first and second input of the transimpedance amplifier, and the summing network being configured to add the compensating voltage to the oscillating voltage to produce the reference voltage. The error amplifier could e.g. comprise an integrator. The summing network may e.g. comprise a voltage-controlled current source. A distinction is sometimes made between a current source and current sink. The former term then designates a device having a positive current flowing out of it, whereas "current sink" designates a device having a positive current flowing into it (or, likewise, a negative current flowing out of it). It the context of the present, taking into account that current is generally considered an algebraic quantity that can be positive and negative, we use the term "current source" concomitantly to designate both a "current source" or a "current sink".

Preferably, the transimpedance amplifier comprises a common base amplifier, the common base amplifier including a current source and a transistor. The advantage of using a common base amplifier is that the input impedance at the second input may be significantly reduced, which results in a more accurate measurement of the AC component necessary to drive the heating element.

A preferred aspect of the present invention concerns a vehicle seat equipped with a combined seat heater and capacitive occupancy sensor.

Preferably, the combined seat heater and capacitive occupancy sensor comprises a driven shield electrode. As used herein, term driven shield electrode designates an antenna electrode, which is kept at substantially the same AC potential as the heating element. As a consequence, the oscillating electric field substantially cancels between the driven shield electrode and the heating element. It follows that a driven shield electrode substantially prevents the heating element from capacitively coupling to objects, which, as seen from the heating element, lie behind the driven shield electrode. One or more driven shield electrodes may thus be used to focus the sensitivity of the heating element towards a region of interest, e.g. the part of space above a vehicle seat that is occupied by a normally seated occupant. To keep the driven shield electrode the same AC potential as the heating element, the driven shield electrode is preferably operatively connected to the one of the third and fourth nodes, which the oscillator is operatively connected to.

The coupling of the two windings of each common mode choke is important. For example, for a DC heating current of 10 A and a typical coupling factor of a common mode choke with windings wound separately (that is, not wound bifilarly) the coupling factor may be around 99%. In this case, the DC current generating a DC magnetic field in the common mode choke is equivalent to 100 mA. With typical core materials and a common mode choke inductance of 1 mH, for example, the shift of the operating point on the B-H curve of the common mode choke will already lead to a significant change of the inductance when the seat heater is switched on. Therefore, the inductance will be different between the states 'heater on' and 'heater off', which may lead to a error in the capacitive measurement when the seat heater is switched.

In order to reduce that problem as much as possible, the coupling of the common mode choke is preferably better than 99%. To achieve this, the common mode choke preferably has the wires that form the windings wound in a bifilar way. Even more preferably, the wires forming the windings of the common mode choke are twisted on one another (i.e. the twisted wirdes are wound around the core).

BRIEF DESCRIPTION OF THE DRAWINGS

Further details and advantages of the present invention will be apparent from the following detailed description of several not limiting embodiments with reference to the attached drawings, wherein.

DESCRIPTION OF PREFERRED EMBODIMENTS

Figure 1:
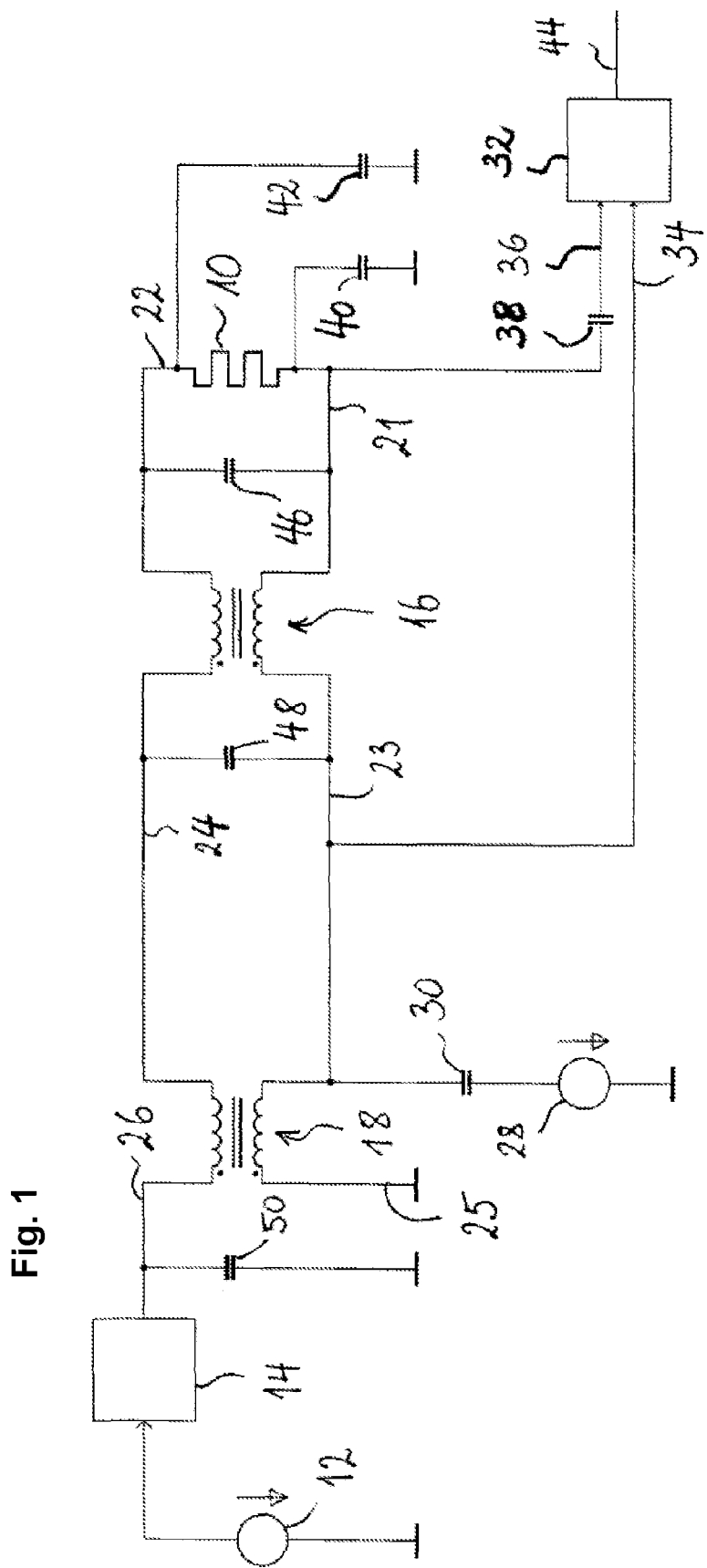
FIG. 1 is a schematic circuit diagram of a combined seat heater and capacitive occupancy sensor according to a first embodiment of the invention.

FIG. 1 shows a block schematic diagram of a combined seat heater and capacitive occupancy sensor according to a first embodiment of the invention. The seat heater comprises a heating element 10, which is used by the capacitive occupancy sensor as an antenna electrode, which capacitively couples to ground. The strength of the capacitive coupling between the heating element 10 and ground depends on whether an occupant is present in the zone between the heating element 10 and the grounded counter-electrode. In a loading-mode capacitive occupancy sensor for a vehicle seat, the grounded counter-electrode normally corresponds to the vehicle chassis.

Turning first to the seat heater, the heater network includes power source 12 supplying the required DC heating current to the heating element 10 to perform the heating function. The heater network comprises a switch 14, which turns the DC heating current on and off, depending on the actual and required temperature of the seat heater. The switch 14 may e.g. be controlled by a user-actuatable master switch (which activates or deactivates the seat heater as a whole) and control electronics (including e.g. a thermostat) that regulate the temperature to ascertain comfortable seating.

The heating element 10 is connected between a first 21 and a second 22 node. When there a potential difference is applied by the power supply between the first and the second nodes 21, 22, the heating current flows across the heating element 10, which is thus caused to dissipate heat. The heating element 10 is operatively connected to the power source 12 with a first common mode choke 16 which connects the first 21 and the second 22 node to a third 23 and a fourth 24 node, respectively, and a second common mode choke 18, which connects the third 23 and the fourth 24 node to a fifth 25 and a sixth 26 node, respectively. In FIG. 1, the fifth node 25 corresponds to ground, whereas the sixth node 26 is operatively connected to the high potential terminal of the power source 12 via the switch 14.

The common mode chokes 16, 18 exhibit low impedance to DC but substantial impedance to AC at the operating frequency of the capacitive occupancy sensor.

The capacitive sensing network comprises an AC voltage source 28, which is AC-coupled by a coupling capacitor 30 to the third node 23 of the heating network, and a transimpedance amplifier 32, the reference input 34 (the above-mentioned first input) of which is connected to the third node and the signal input 36 (the above-mentioned second input) of which is AC-coupled to the first node by coupling capacitor 38.

When the seat heater is supplied with DC heating current (i.e. when switch 14 is closed), current flows from power source 12 though switch 14, the node 26 herein designated as sixth node, the first winding of common mode choke 18, the node 24 herein designated as fourth node, the first winding of common mode choke 16, the node 22 herein designated as second node, the heating element 10, the node 21 herein designated as first node, the second winding of common mode chokes 16, the node 23 herein designated as third node, the second winding of common mode choke 18, to the node 25 herein designated as fifth node, which is tied to ground potential. The heating circuit is closed via the ground connection between the fifth node 25 and power source 12.

Switch 14 may be used to control the temperature of the seat by switching the seat heater on and off. A temperature sensor (not shown in the drawings) integrated in the seat may determine the seat temperature. A heating controller (e.g. a microcontroller) connected to switch 14 and to the temperature sensor reads the actual seat temperature from the temperature sensor and switches switch 14 on or off depending on the required temperature and the actually measured temperature. Such temperature control may be applied likewise to all the embodiments described herein.

AC voltage source 28 applies an AC voltage on node 23 through coupling capacitor 30. The frequency of the AC voltage (oscillating voltage) may e.g. be chosen to be 1 MHz. The reference input of transimpedance amplifier 32 is also connected to node 23. Through internal feedback the transimpedance amplifier 32 generates substantially the same AC voltage on its signal input 36 as on its reference input. It follows that the transimpedance amplifier 32 applies substantially the same AC voltage to the first node 21 (through coupling capacitor 38) as the AC voltage source 28 applies to the third node 23. Capacitors 40 and 42 symbolically represent the capacitive coupling of the heating element 10 to a grounded electrode (typically the vehicle frame). The capacitance (and hence the impedance) of these capacitors 40, 42 depends on whether the space between the heating element 10 and the grounded electrode is occupied by a conductive body (e.g. an occupant) or not. As the impedance of heating element 10 is very low in comparison with the impedance to be measured (which is the impedance of capacitors 40 and 42), the AC voltage also appears on the second node 22.

Most of the AC current flowing between the heating element 10 and ground flows into (or out of, depending on whether one considers positive or negative current) the signal input 36 of transimpedance amplifier 32. Only a small part of the AC current leaks through the common mode choke 16 because the impedance of the common mode choke 16, defined largely by its inductance, is purposely chosen much higher than the input impedance between the signal input 36 and reference input 34 of the transimpedance amplifier 32. For example, for an input impedance of the transimpedance amplifier of 10Ω and an operating frequency of 1 MHz, the impedance of the common mode choke should preferably amount to at least 100Ω at this frequency, or 16 µH. As common mode chokes, one could then select, for instance, TN14/9/5 toroid-cores made of 4C65 material with a diameter of 14.6 mm and height of 5.5 mm from the company Ferroxcube. If one had to use individual inductors, each common mode choke would have to be replaced by two appropriately dimensioned individual inductors. In this case, to achieve an impedance of 100Ω at 1 MHz, one could use TN20/10/7 type toroid cores with a diameter of 20.7 mm and height of 7.5 mm (available from the same manufacturer). The reason why the common mode choke is smaller than each of the single chokes is that in the common mode choke, due the coupling factor approximately equal to 1, the DC magnetic field induced by the DC current through the coils almost totally cancels in the common mode choke whereas it does not cancel in an individual coil. The core size has to be chosen such that the cores do not saturate due to the DC magnetic field, which is substantially larger in single chokes than in the common mode chokes as explained above.

It follows that the AC current supplied by transimpedance amplifier 32 is essentially equal to the AC current that flows between the heating element 10 and ground (through capacitors 40 and 42). In other words, transimpedance amplifier 32 converts the AC current that flows between the heating element 10 and ground into an AC voltage, which the transimpedance amplifier 32 outputs on its output node 44. AC output voltage may be further processed to retrieve its amplitude and phase with respect to the AC voltage supplied by AC voltage source 28 in order to derive the capacitance or impedance to be measured.

Capacitor 46 has an impedance which is substantially smaller than the impedance of the total capacitance to be measured. In the absence of capacitor 46, an interruption (break) of the heating element 10 would result in a substantially smaller antenna electrode: this, in turn, would reduce the measurable capacitance. For instance, if heating element 10 shown in FIG. 1 breaks in the middle, only capacitance 40 would be measured by the measurement circuit. Coupling capacitor 46 achieves an AC short between the first and second nodes 21, 22, i.e. the terminals of the heating element 10. If a (single) break occurs in heating element 10, then the capacitive sensing network remains substantially unaffected and still measures the total capacitance between the heating element 10 and ground due to the AC shunt provided by capacitor 46. Coupling capacitor 48 provides an AC short between the third node 23 and the fourth node 24—it may be used alternatively or additionally to coupling capacitor 46. Coupling capacitor 50 provides an AC short between the fifth node 25 and the sixth node 26. Capacitor 50 avoids that any AC current coming from the AC signal source 28 is fed back into the DC power source 12 and thereby possibly into the car power network.

Additionally, an interruption of the heating element 10 can be detected by measuring the DC heating current when the seat heater is switched on. Alternatively, a DC test current which is substantially lower than the heating current can be injected in order to detect an interruption, for example while heating is not desired. A warning can be issued to the car user if the heating current does not flow or if the current that flows lies below a certain threshold.

Figure 2:
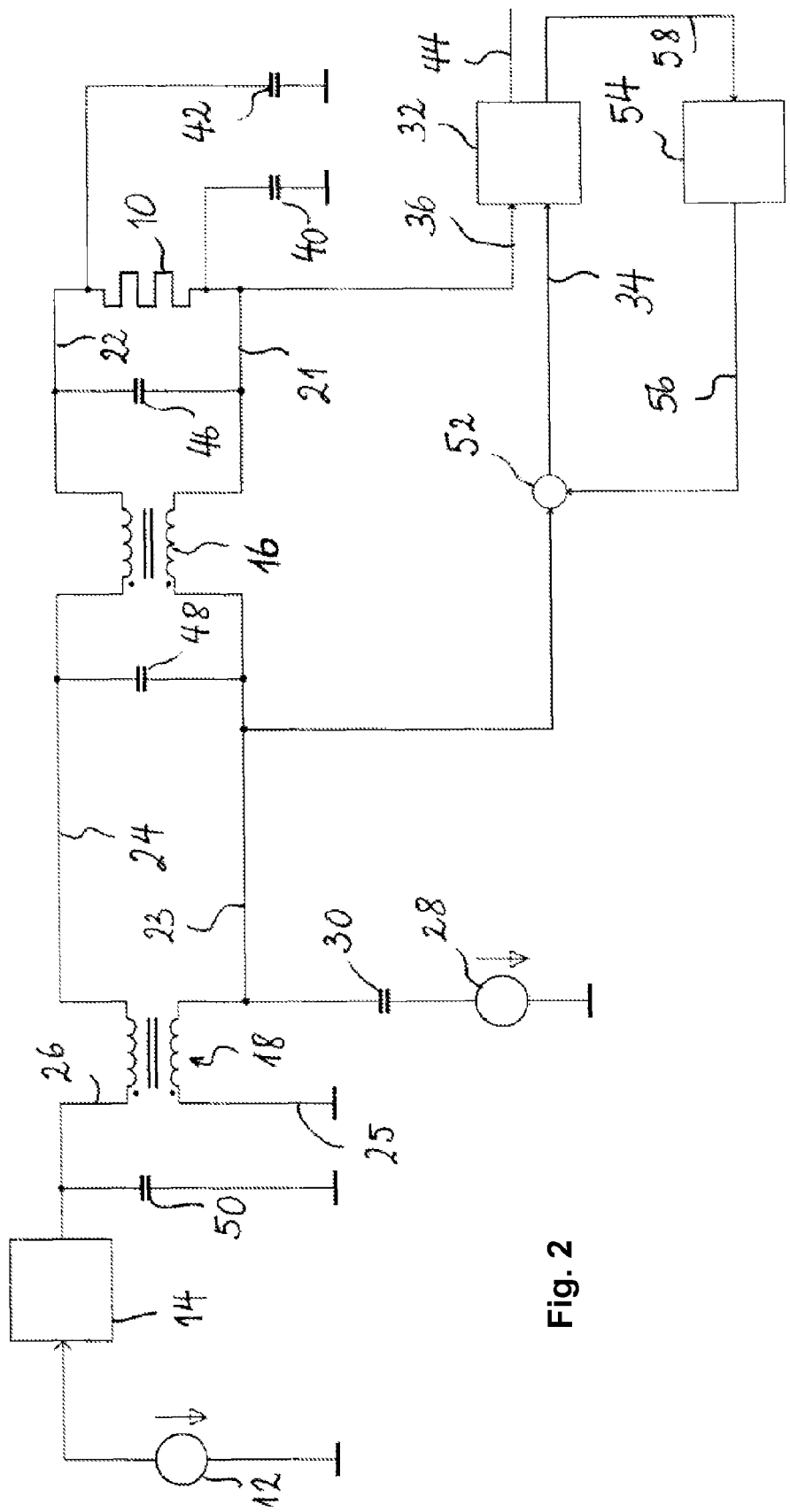
FIG. 2 is a schematic circuit diagram of a combined seat heater and capacitive occupancy sensor according to a second embodiment of the invention.

FIG. 2 shows a second embodiment of the invention, which slightly differs from the embodiment illustrated in FIG. 1.

Elements in common to both embodiments, having the same or substantially the same function, have been given the same reference numbers in FIG. 2 as in FIG. 1 and need not be explained again. In particular, the components of the heater network operate in the same way in both embodiments.

Unlike in the embodiment of FIG. 1, the connection line between the signal input 36 of the transimpedance amplifier 32 and the first node 21 contains no coupling capacitor to prevent direct current from flowing between the signal input 36 of transimpedance amplifier 32 and the heating element 10.

AC voltage source 28 applies an AC voltage on node 23 through coupling capacitor 30. The frequency of the AC voltage (oscillating voltage) may e.g. be 1 MHz. Summing device 52 receives this AC voltage on its input connected to the third node 23 and transfers this AC voltage to the reference input 34 of transimpedance amplifier 32. The other input of summing device 52 is connected to the output 56 of error amplifier 54. As the latter produces a DC signal, the same AC voltage (possibly with a DC offset, which we will consider below) as on the node 23 appears on input 34 of the transimpedance amplifier 32. The transimpedance amplifier 32 attempts to maintain its signal input 36 at the same potential as the reference input 34 through its internal feedback. It follows that the AC voltage applied to reference input 34 is also applied to the heating element 10 by the transimpedance amplifier 32. Due to coupling capacitor 46 and the low impedance of heating element 10 at the frequency of the AC voltage, the AC voltage also appears on the second node 22.

When the seat heater is on, i.e. when the (DC) heating current is flowing, a voltage drop occurs between the first and the third nodes 21, 23 due to the non-zero resistance of the common mode choke 16. This DC voltage drop would normally "upset" the transimpedance amplifier 32, be cause it would attempt to minimize the potential difference between its inputs 34, 36 and thereby drive its output 44 to one of the supply voltage rails (not shown).

To prevent this from happening, capacitive sensing network comprises a compensating network, which compensates a DC voltage drop between the reference input 34 and the signal input 36 of the transimpedance amplifier 32. The compensating network is configured as a feedback loop comprising the error amplifier 54 and the summing device 52. The transimpedance amplifier 32 comprises a DC output 58, on which it outputs a signal indicative of the DC current that flows into the transimpedance amplifier 32. The error amplifier 54 compares this signal with a reference signal, for example a DC voltage of 0 V, by subtraction. The result of the subtraction operation is added by summing device 52 to the DC voltage that is present on the third node 23. The sum of the error voltage (which is a DC voltage) produced by error amplifier 54 and the voltage of the third node 23 (which contains the AC component applied by the AC signal source 28 and a DC component if the seat heater is on) is used as input signal to the reference input 34 of the transimpedance amplifier 32. The compensating network thus sets the DC output voltage of the transimpedance amplifier 32 equal to the reference voltage of error amplifier 54 and thus keeps the transimpedance amplifier 32 within its operating range, independently of the DC voltage drop across common mode choke 16.

Figure 3:
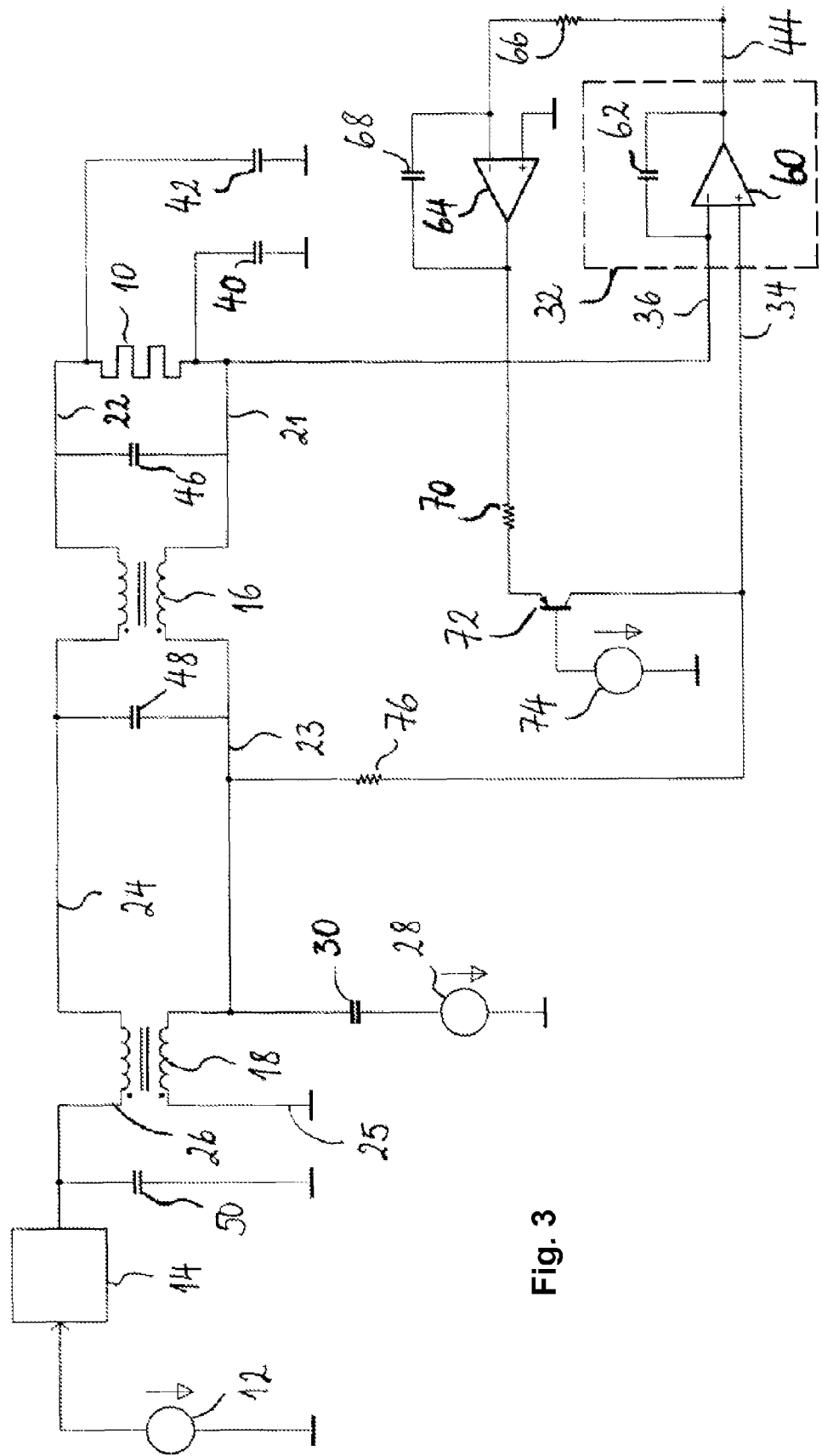
FIG. 3 is a schematic circuit diagram of a first variant of the embodiment of FIG. 2.

FIG. 3 shows a preferred variant of the combined seat heater and capacitive occupancy sensor of FIG. 2. In particular, FIG. 3 illustrates a possible way to implement the transimpedance amplifier 32 and the compensating network introduced in the description of FIG. 2. FIG. 3 thus uses the same reference numbers as FIG. 2 where appropriate. Elements that have already been discussed with reference to FIG. 2 will not be discussed again for sake of conciseness.

Transimpedance amplifier 32 comprises an operational amplifier 60 and a feedback capacitor 62 coupled between the output 44 and the signal input 36 (here: the inverting input) of the operational amplifier 60.

The error amplifier is implemented as an integrator comprising a further operational amplifier 64, resistor 66 and capacitor 68. The inverting input of operational amplifier 64 is connected to the output 44 of operational amplifier 60 via resistor 66. The non-inverting input of operational amplifier 64 is connected to ground, which serves here as the reference voltage for the compensating signal. The voltage on output 44 is indicative of the current (containing an AC component as well as a DC component) flowing into the signal input 36 of transimpedance amplifier 32. The integrator is configured to have low AC gain at the operating frequency of the capacitive measurement. Accordingly, the integrator is only responsive to the DC component of the output signal of the transimpedance amplifier 32. The compensating voltage applied at the output of the integrator thus corresponds to a time-integral of the DC component of the output signal of the transimpedance amplifier 32.

The summing device shown in FIG. 2 is implemented as a summing network, comprising a voltage controlled current source. The voltage controlled current source is comprised of resistor 70, transistor 72, biasing voltage source 74. The output voltage of operational amplifier 64 causes a current flowing through resistor 70, transistor 72, resistor 76, the third node 23 and from there to ground via the second winding of common node choke 18. The current across each of resistor 70, transistor 72 and resistor 76 is essentially the same because the base current out of transistor 72 and any current into the reference input 34 of amplifier 60 can be neglected in this circuit. The voltage on the reference input 34 of transimpedance amplifier 32 is thus equal to the sum of the voltage on node 23 and the voltage across resistor 76. The voltage across resistor 76 may be calculated as the product of the resistance of resistor 76 and the current through resistor 76 (which, as said above, is substantially equal to the current through resistor 70). The current across resistor 70 is determined as the ratio of the voltage difference between the output voltage of amplifier 64 and the substantially constant emitter voltage of transistor 72, and the resistance of resistor 70. In turn, the voltage on the emitter of transistor 72 is equal to the sum of the constant voltage of bias voltage source 74 and the substantially constant emitter-base voltage drop of transistor 72. Consequently, one may write:

$$U_{34}=U_{23}+R_{76}/R_{70}\cdot(U_{64}-U_{74}-U_{EB}),$$

where $U_{34}$ designates the voltage on the reference input 34 of transimpedance amplifier 32, $U_{64}$ designates the output voltage of amplifier 64, $U_{23}$ the potential of the third node 23, $R_{76}$ the resistance of resistor 76, $R_{70}$ the resistance of resistor 70, $U_{74}$ the voltage applied by the biasing voltage source to the base of transistor 72, and $U_{EB}$ the emitter-base voltage drop of transistor 72.

As the voltage $U_{64}-U_{74}-U_{EB}$ varies only slowly compared to the oscillation frequency of the AC voltage applied by AC voltage source, the AC component of voltage $U_{34}$ is equal to the AC component of $U_{23}$ (in other words, there is only a DC offset between $U_{23}$ and $U_{34}$). It may be noted that the ratio $R_{76}/R_{70}$ is not critical, since any residual potential difference between the third node 23 and the first node 21 will quickly be cancelled via the feedback loop with the error integrator.

Figure 4:
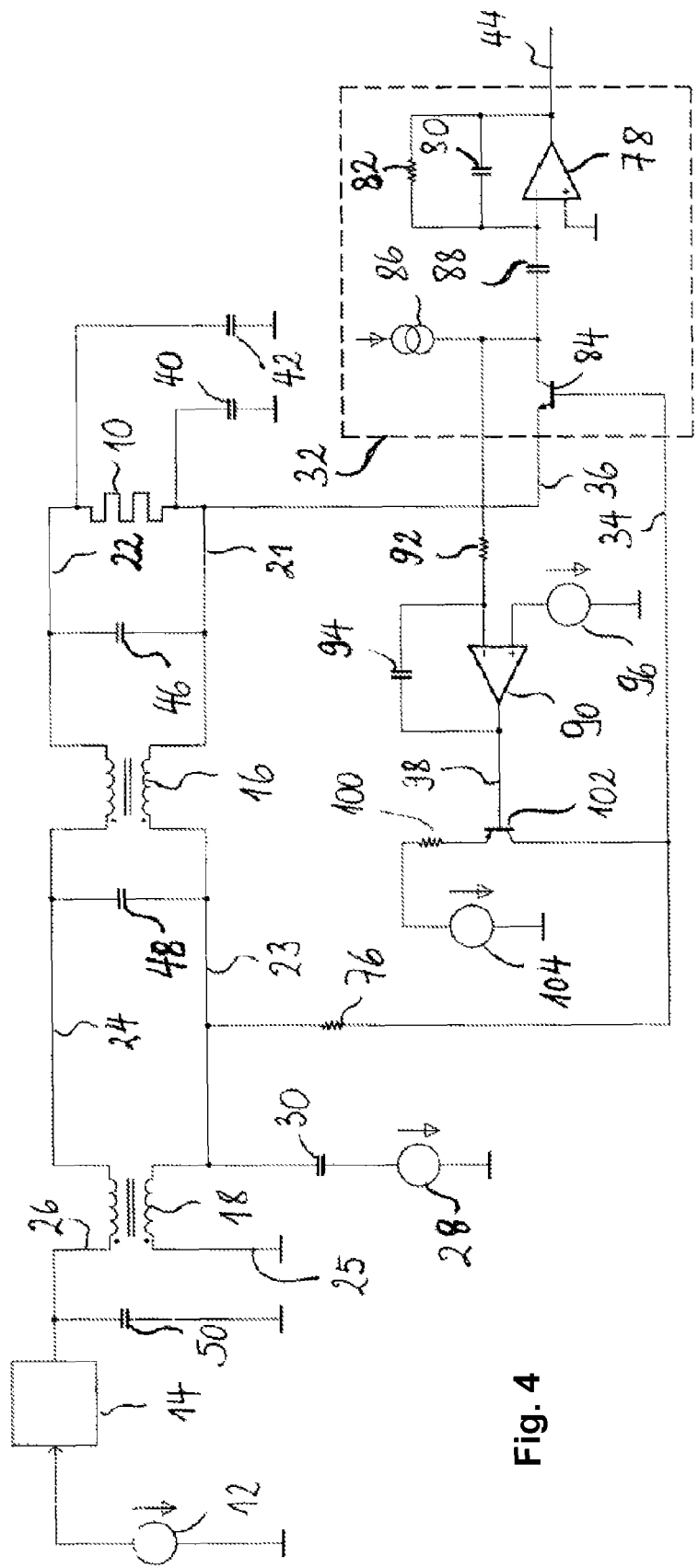
FIG. 4 is a schematic circuit diagram of a second variant of the embodiment of FIG. 2.

FIG. 4 shows a further preferred variant of the combined seat heater and capacitive occupancy sensor of FIG. 2. In particular, FIG. 4 illustrates a further possible way to implement the transimpedance amplifier 32 and the compensating network introduced in the description of FIG. 2. FIG. 4 uses the same reference numbers as FIG. 2 where appropriate. Elements that have already been discussed with reference to FIG. 2 will not be discussed again for sake of conciseness.

Transimpedance amplifier 32 comprises an operational amplifier 78, a feedback branch with feedback capacitor 80 electrically in parallel to feedback resistor 82. Transimpedance amplifier 32 further comprises a common base amplifier, which includes transistor 84 and current source 86. The reference input 34 of transimpedance amplifier 32 is formed by the base input of transistor 84. The emitter input of transistor 84 represents the signal input 36 of the transimpedance amplifier 32. The collector of transistor 84 is AC-coupled to the inverting input of operational amplifier 78 via coupling capacitor 88. The advantage of using a common base amplifier in front of the operational amplifier 78 is that the input impedance of the transimpedance amplifier 32 in FIG. 4 is lower than the impedance of transimpedance amplifier 32 of FIG. 3 due to the low input impedance of the common base circuit.

The error amplifier of the embodiment of FIG. 4 is implemented as an integrator, comprising operational amplifier 90, resistor 92, capacitor 94 and biasing voltage source 96. The inverting input of operational amplifier 90 is connected to the collector of transistor 84 via resistor 92. The DC component of the voltage on the collector of transistor 84 is indicative of the DC current flowing into (or out of) the signal input 36 of the transimpedance amplifier 32. The AC component of the voltage on the collector of transistor 84 is shorted by coupling capacitor 88 to the virtual ground voltage at the inverting input of operational amplifier 78.

The error amplifier provides at its output 98 the time-integral of the voltage difference between the collector of transistor 84 and the reference voltage applied by voltage source 96 to the non-inverting input of operational amplifier 90.

A summing network is provided by resistor 76, connected between the third node 23 and the reference input 34 of the transimpedance amplifier 32 and a voltage controlled current source, which comprises resistor 100, transistor 102 and biasing voltage source 104. The voltage controlled current source converts the (DC) output voltage of error amplifier 90 to a current across resistor 100, transistor 102 and resistor 76. This results in a voltage drop across resistor 76. In turn, the voltage on the reference input 34 of transimpedance amplifier 32 may be expressed as the sum of the voltage on the third node 23 and the voltage drop across resistor 76. One may now use the property that the current across resistor 76 is essentially equal to the current across resistor 100 (because one can neglect the currents into the bases of transistors 102 and 84). The voltage $U_E$ at the emitter of transistor 102 is equal to the sum of output voltage of operational amplifier 90 ($U_{98}$) and the emitter-base voltage drop $U_{EB}$ of transistor 102. The voltage drop $U_{100}$ across resistor 100 may thus be expressed as $U_{100}=U_{104}-U_{98}-U_{EB}$, where $U_{104}$ is the bias voltage applied by biasing voltage source 104. It follows that the voltage $U_{34}$ on the reference input of transimpedance amplifier 32 may be expressed as $$U_{34}=U_{23}+R_{76}/R_{100}\cdot(U_{104}-U_{98}-U_{EB}).$$

Biasing voltage source 96 sets the DC bias level of the collector voltage of transistor 84, which bias level is substantially equal to the voltage applied to the non-inverting input of operational amplifier 90 by the biasing voltage source 96 because of the high input impedance of the error amplifier.

As the voltage $U_{104}-U_{98}-U_{EB}$ varies only slowly compared to the oscillation frequency of the AC voltage applied by AC voltage source 28, the AC component of voltage $U_{34}$ is equal to the AC component of $U_{23}$ (in other words, there is only a DC offset between $U_{23}$ and $U_{34}$). The ratio $R_{76}/R_{100}$ is not critical, since the feedback loop with the error integrator and the summing network will maintain the voltage difference between the reference input and the signal input of the transimpedance amplifier substantially equal to the base-emitter voltage drop of transistor 84 when the DC voltage level of the first node 21 changes.

Figure 5:
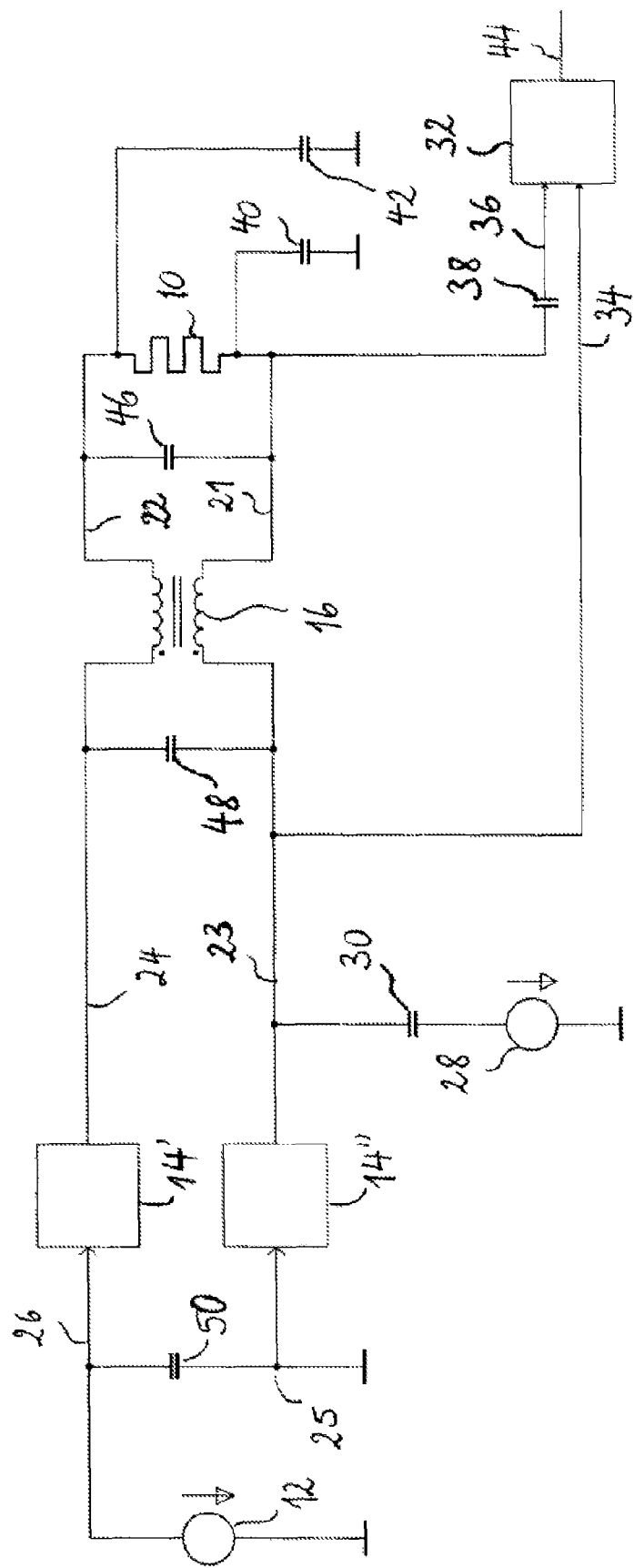
FIG. 5 is a schematic circuit diagram of a combined seat heater and capacitive occupancy sensor according to a third embodiment of the invention.

FIG. 5 shows a further preferred embodiment of a combined seat heater and capacitive occupancy sensor. The embodiment of FIG. 5 differs from the embodiment of FIG. 1 in that the common mode choke 18 has been replaced by switches 14' and 14". The capacitive sensing network of FIG. 5 is identical to the one of FIG. 1. Elements in common to both embodiments, having the same or substantially the same function, have been given the same reference numbers in FIG. 5 as in FIG. 1 and need not be explained in detail again.

Unlike in the preceding embodiments, the combined seat heater and capacitive occupancy sensor of FIG. 5 cannot simultaneously operate in heating mode and occupancy sensing mode.

When the seat heater is required to heat, both switches 14' and 14" are switched on, so that the DC heating current is allowed to flow from the sixth node 26 through switch 14' to the fourth node 24 and the first winding of common mode choke 16 through the heating element 10, the second winding of common mode choke 16, the third node 23, switch 14" and via the ground connection back to the DC power supply 12. In heating mode, the capacitive measurement is not possible because the third node 23 is short-circuited to ground via switch 14". Accordingly, AC voltage source 28 is preferably switched off, when the system is in heating mode.

When the system is to be used as occupancy sensor, both switches 14' and 14" are switched off and the AC voltage source is switched on. The capacitive measurement is carried out in the same way as described with reference to FIG. 1.

Figure 6:
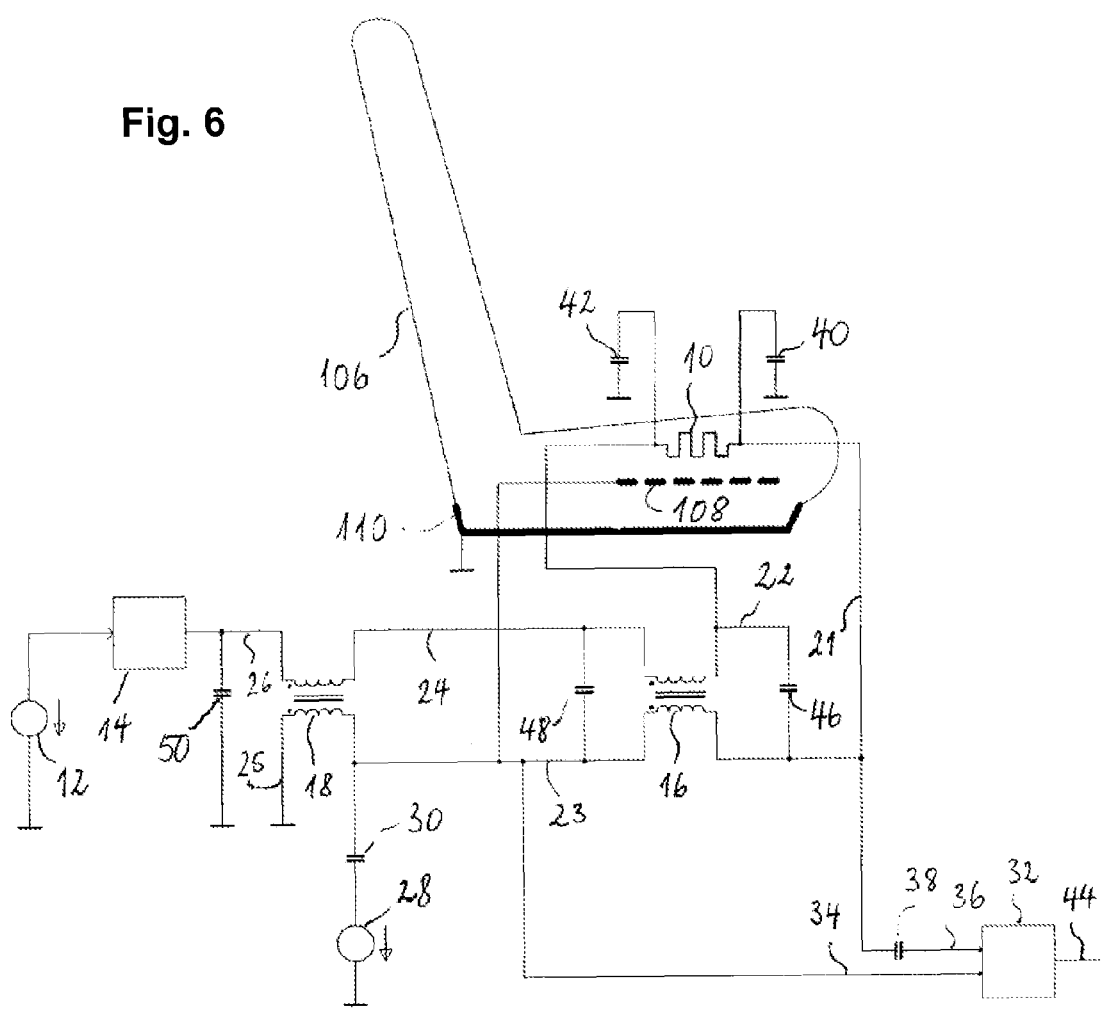
FIG. 6 is a schematic illustration of a vehicle seat equipped with a combined seat heater and capacitive occupancy sensor substantially as in FIG. 1.

FIG. 6 schematically shows a vehicle seat 106 equipped with a combined seat heater and capacitive occupancy sensor, which essentially corresponds to the one shown in FIG. 1, except for the driven shield electrode (or guard electrode) 108 connected to the third node 23.

Heating element 10 is arranged in seat 106, more specifically underneath the seating surface. In addition to the capacitance or impedance to be measured (illustrated again by capacitors 40 and 42), there is an additional capacitance between the heating element 10 and the seat frame 110. The additional capacitance is in parallel to the capacitance to be measured and may introduce considerable measurement errors, because it is not well known and may vary during the lifetime of the application. In order to suppress the influence of the additional capacitance, a guard electrode 108 is arranged between the seat heater 10 and the seat frame 110. The guard electrode 108 may e.g. be a conductive foil or textile, which covers at least the area spanned by the heating element 10. Preferably the guard electrode 108 is larger than the area spanned by the heating element 10 for better shielding. As indicated above, the guard electrode 108 is electrically connected to the third node 23. As the AC voltage on the heating element 10 is substantially equal to the AC voltage on node 23 when the capacitive measurement is carried out, there is only a very small AC voltage difference between the heating element 10 and the guard electrode 108. As a result, substantially no AC current flows between the heating element 10 and the guard electrode 108. The guard electrode 108 being arranged between the heating element 10 and the seat frame 110, substantially no AC current flows between the heating element 10 and the seat frame 110.

It should be note that coupling capacitors 46, 48, 50 fulfill the same purpose in FIGS. 2-6 as in FIG. 1.

In any of the above embodiments, the AC voltage output by the transimpedance amplifier 32 indicates the AC component of the current flowing into the signal input of the transimpedance amplifier 32. It follows that the complex impedance to be measured may be determined as the ratio of the (complex) AC voltage applied by the AC voltage source 28 to the (complex) voltage AC voltage output by the transimpedance amplifier 32 on output node 44. The amplitude and the phase or, alternatively, the in-phase ("imaginary") component and the 90°-phase-shift ("real") component of the AC voltage applied by the AC voltage source 28 being known, it is possible to retrieve the impedance and thus the capacitance to be measured. In a practical application, the occupancy state may thus be determined based on amplitude and phase or, alternatively, from the real and the imaginary components of the AC voltage output by the transimpedance amplifier.

A particularly advantageous way to determine the occupancy state is disclosed in international patent application WO 2008/095939. The method disclosed in this application may be used to determine the real and the imaginary components of the AC voltage output by the transimpedance amplifier 32. In particular, the AC voltage output by the transimpedance amplifier 32 may be fed to a clocked rectifier, synchronised by means of the AC voltage supplied by the AC voltage source as a reference. The low-pass-filtered signals output by the clocked rectifier are then indicative of the real component and the imaginary component of the AC voltage output by the transimpedance amplifier. They may be supplied to an analog-to-digital converter, which forwards them in digital form to a microprocessor.

Figure 7:
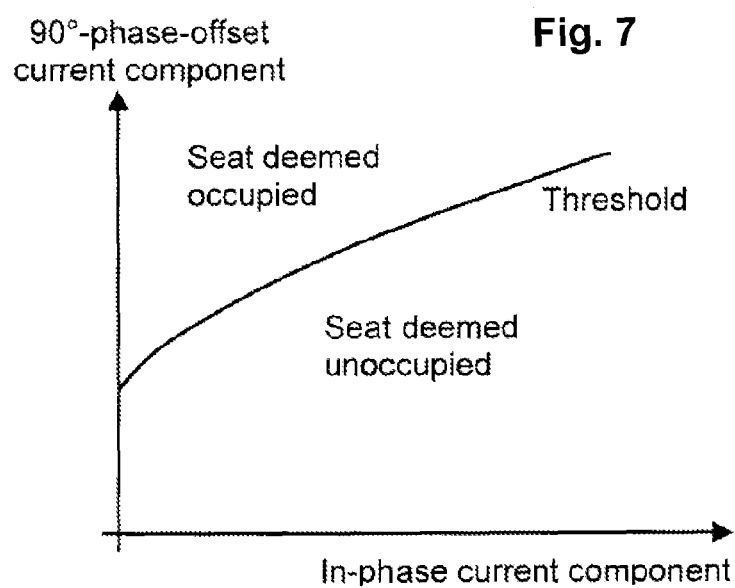
FIG. 7 is a graph representing, as a function of the imaginary current component, the threshold for the real current component, above which a seat is recognized as occupied and below which the seat is deemed unoccupied.

The microprocessor may then determine an occupancy state e.g. by comparing the real component with a threshold, the threshold being dependent upon the imaginary component. FIG. 7 shows a graph representing the threshold for the real (90°-phase-offset) component as a function increasing with the imaginary (in-phase) component. If the real component (indicative of the capacitance to be measured) is found to be below the threshold curve for the determined imaginary component (indicative of a resistive current path from the heating element to ground), the seat is deemed unoccupied by a person; if it is found to be above the threshold for the determined imaginary component, the seat is deemed occupied by a person. Depending on the outcome of the determination of the occupancy state, the microprocessor may issue an output signal communicating the occupancy state to an appliance connected to the combined seat heater and capacitive occupancy sensor, e.g. the control unit of an airbag system or a seat belt warning device. The threshold for the real component being increasing with increasing imaginary component may compensate for a resistive current path from the heating element to ground, e.g. due to a wet seat.

Figure 8:
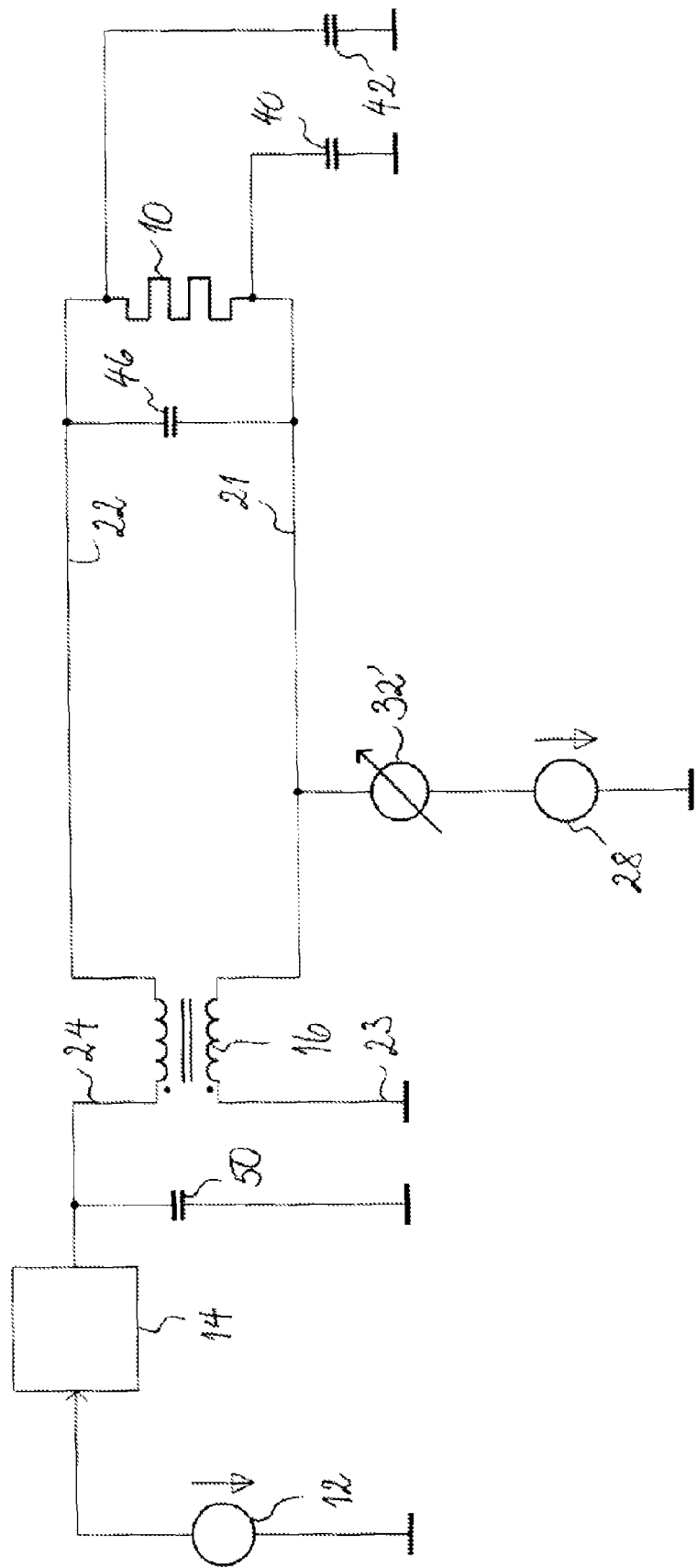
FIG. 8 is a schematic circuit diagram of a combined seat heater and capacitive occupancy sensor according to a further embodiment of the invention.

FIG. 8 shows a block schematic diagram of a combined seat heater and capacitive occupancy sensor according to a fourth embodiment of the invention.

As in the previously discussed embodiments, the heater network includes a power source 12 supplying the required DC heating current to the heating element 10 to perform the heating function. The heater network comprises a switch 14, which turns the DC heating current on and off, depending on the actual and required temperature of the seat heater.

The heating element 10 is connected between a first 21 and a second 22 node. When there a potential difference is applied by the power supply between the first and the second nodes 21, 22, the heating current flows across the heating element 10, which is thus caused to dissipate heat. The heating element 10 is operatively connected to the power source 12 with a first common mode choke 16 which connects the first 21 and the second 22 node to a third 23 and a fourth 24 node, respectively. In FIG. 8, the third node 23 corresponds to ground, whereas the fourth node 24 is operatively connected to the high potential terminal of the power source 12 via the switch 14.

The common mode choke 16 exhibits low impedance to DC but substantial impedance to AC at the operating frequency of the capacitive occupancy sensor.

The capacitive sensing network comprises an AC voltage source 28, which is connected to the first node 21 via current meter 32'.

When the seat heater is supplied with DC heating current (i.e. when switch 14 is closed), current flows from power source 12 though switch 14, the fourth node 24, the first winding of common mode choke 16, the second node 22 herein designated as second node, the heating element 10, the first node 21, the second winding of common mode choke 16 to the third node 23, which is tied to ground potential. The heating circuit is closed via the ground connection between the third node 23 and power source 12.

Coupling capacitor 46 has substantially smaller impedance than the impedance of the total capacitance to be measured. It achieves an AC short between the first and second nodes 21, 22, i.e. the terminals of the heating element 10. If a (single) break occurs in heating element 10, then the capacitive sensing network remains substantially unaffected and still measures the total capacitance between the heating element 10 and ground. Coupling capacitor 50 provides an AC short between the third node 23 and the fourth node 24—it avoids that any AC current coming from the AC signal source 28 is fed back into the DC power source 12 and thereby possibly into the car power network.

AC signal source 28 generates an AC voltage at a selectable frequency. The frequency may be set by a microcontroller (not shown). The amplitude and the frequency of the AC voltage output by AC signal source is known. Current meter 32'measures the current flowing into the parallel network of the impedance (or: admittance) to be measured and the common mode choke 16.

The current meter 32' comprises an IQ demodulator, which uses the AC signal source 28 as the local oscillator input. The IQ demodulator outputs the real and imaginary parts of the current measured with current meter 32'. The real part is indicative of the resistive part (conductance) of the admittance of the parallel combination of the unknown admittance and the common mode choke. The imaginary part is indicative of the reactive part (susceptance) of the admittance of parallel combination of the unknown admittance and the common mode choke.

As the common mode choke 16 has itself an admittance, which is mainly inductive, this part must be eliminated from the imaginary output of the IQ demodulator. The first option is that the inductance of the common mode choke is known a priori. The microcontroller then can remove the known inductive admittance from the total admittance measured and obtains the capacitance (susceptance) of the unknown admittance. The second option is to perform two consecutive measurements at two distinct, known frequencies $f_1$ and $f_2$, recording the imaginary parts $l_{i1}$ and $l_{i2}$ of the complex currents measured at these two frequencies respectively. The following equation will then yield the unknown capacitance $C_x$:

$$C_x = \frac{f_1 \cdot I_{i1} - f_2 \cdot I_{i2}}{2 \cdot \pi \cdot U \cdot (f_2^2 - f_1^2)},$$

where U is the amplitude of the AC voltage generated by AC source 200.

The current meter 32' of FIG. 8 is preferably implemented as a transimpedance amplifier (not shown in FIG. 8) having a first input AC-coupled to the oscillator to receive the oscillating voltage as an AC component of a reference voltage and a second input AC-coupled to the first node 21. The transimpedance amplifier is preferably configured to maintain the voltage on the second input node equal (within a certain tolerance range) to the reference voltage by driving a current into the second input (and thus into the first node) and to output the signal indicative at least of an AC component of the current driven into the first node. The output of the transimpedance amplifier is fed to the IQ demodulator, which may be implemented with a clocked rectifier as discussed for the other embodiments.

For specific implementations of a clocked rectifier the interested reader is referred to document WO 2008/095939, incorporated herein by reference in its entirety with effect for those jurisdictions, which permit incorporation by reference.

In FIGS. 1 to 4 and 6, switch 14 is connected between the positive terminal of the power source 12 and the heating element 10. Obviously, the heater network would also work if the switch 14 were connected to between the negative terminal of the power source 12 and the heating element 10. In this case, however, some of the capacitive sensing networks described hereinabove have to be adapted to work with a switched negative power supply. The same is true if the AC voltage source 28 and the reference input 34 of the operational amplifier 32 are operatively connected to the fourth node 24 instead of the third node 23. In the light of the above description, the necessary modifications are readily apparent to those skilled in the art and need not be explained in detail.

In general, while specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. Combined seat heater and capacitive occupancy sensor, comprising
a heater network including a heating element connected between a first node and a second node to dissipate heat when a heating current is caused to flow between said first and second nodes,
a capacitive sensing network connected to said heating element to apply an oscillating voltage thereto and to derive a capacitive load of said heating element from a current flowing into said heating element in response to said application of said oscillating voltage;
wherein said heater network comprises a common mode choke connecting said first and said second node to a third and a fourth node, respectively,
and wherein said capacitive sensing network comprises
an oscillator which is AC-coupled to at least one of said third and fourth nodes to drive said oscillating voltage into said at least one of said third and fourth nodes;
as well as a transimpedance amplifier having a first input AC-coupled to said at least one of said third and fourth nodes to receive said oscillating voltage as an AC component of a reference voltage, a second input operatively connected to at least one of said first and second nodes, said transimpedance amplifier being configured to maintain a voltage on said second input node equal to said reference voltage by driving a current into said second input, said transimpedance amplifier having an output to provide a signal indicative at least of an AC component of said current driven into said second input.

2. Combined seat heater and capacitive occupancy sensor as claimed in claim 1, wherein said heater network includes a further common mode choke connecting said third and said fourth node to a fifth and a sixth node, respectively, said fifth and sixth nodes being connectable to a power source for said heating network.

3. Combined seat heater and capacitive occupancy sensor as claimed in claim 2, wherein said heater network includes a fifth and a sixth node, as well as a first and a second switch, said first switch being connected between said third and fifth node, said second switch being connected between said fourth and sixth node, said fifth and sixth nodes being connectable to a power source for said heating network.

4. Combined seat heater and capacitive occupancy sensor as claimed in claim 1, wherein said first and second nodes are AC-coupled with one another and/or wherein said third and fourth nodes are AC-coupled with one another.

5. Combined seat heater and capacitive occupancy sensor as claimed in claim 2, wherein said fifth and sixth nodes are AC-coupled with one another.

6. Combined seat heater and capacitive occupancy sensor as claimed in claim 1, wherein said second input of said transimpedance amplifier is AC-coupled to said at least one of said first and second nodes with a coupling capacitor.

7. Combined seat heater and capacitive occupancy sensor as claimed in claim 1, wherein said capacitive sensing network comprises a compensating network configured to compensate a DC voltage drop between said first and second input of said transimpedance amplifier.

8. Combined seat heater and capacitive occupancy sensor as claimed in claim 7, wherein said compensating network comprises a feedback loop configured to add a compensating voltage to said oscillating voltage to produce said reference voltage.

9. Combined seat heater and capacitive occupancy sensor as claimed in claim 8, wherein said feedback loop comprises an error amplifier and a summing network, said summing network being connected between said at least one of said third and fourth nodes, said error amplifier and said first input of said transimpedance amplifier, said error amplifier being configured to output said compensating voltage when there is a DC voltage drop between said first and second input of said transimpedance amplifier, and said summing network being configured to add said compensating voltage to said oscillating voltage to produce said reference voltage.

10. Combined seat heater and capacitive occupancy sensor as claimed in claim 9, wherein said error amplifier comprises an integrator.

11. Combined seat heater and capacitive occupancy sensor as claimed in claim 9, wherein said summing network comprises a voltage-controlled current source.

12. Combined seat heater and capacitive occupancy sensor as claimed in claim 1, wherein said transimpedance amplifier comprises a common base amplifier, said common base amplifier including a current source and a transistor.

13. Combined seat heater and capacitive occupancy sensor as claimed in claim 1, wherein said capacitive sensing network configured to derive not only said capacitive load but also a resistive part of a complex impedance between said heating element and ground.

14. Vehicle seat, comprising a combined seat heater and capacitive occupancy sensor as claimed in claim 1.

15. Vehicle seat as claimed in claim 14, wherein said combined seat heater and capacitive occupancy sensor comprises a driven shield electrode.

16. Vehicle seat as claimed in claim 15, wherein said driven shield electrode is operatively connected to said at least one of said third and fourth nodes.

17. The combined seat heater and capacitive occupancy sensor of claim 1, wherein the first node and the second node are AC-coupled through a first coupling capacitor.

18. The combined seat heater and capacitive occupancy sensor of claim 17, wherein the first coupling capacitor has impedance substantially smaller than the impedance of the total capacitance to be measured by the capacitive sensing network.

19. The combined seat heater and capacitive occupancy sensor of claim 17, wherein the third node and the fourth node are AC-coupled through a second coupling capacitor.

* * * * *